United States Patent Office 3,168,371
Patented Feb. 2, 1965

3,168,371
PROCESS FOR PRODUCING HIGH DENSITY
URANIA FUEL ELEMENTS
Philippe D. S. St. Pierre, Schenectady, N.Y., assignor to
General Electric Company, a corporation of New York
No Drawing. Filed Oct. 28, 1960, Ser. No. 65,609
2 Claims. (Cl. 23—14.5)

The present invention relates to a process for making material useful as a fuel element in nuclear reactors generally and more in particular to power reactors of a solid fuel type.

Heretofore, reactors have usually had metallic fuel elements. Certain disadvantages are inherent in fuel elements of this type and oxide fuel elements have long been sought to replace the metallic elements.

In the preparation of uranium dioxide, it has been known that a satisfactory method of preparing this material is the decomposition of ammonium diuranate to give uranium dioxide. Unfortunately, however, the most easily sintered powder is so fine that it is pyrophoric. This makes handling and processing most difficult. This material has heretofore been calcined and then formed into pellets, either alone or mixed with other active oxides. It has been found that the oxygen/uranium ratio is not always 2.00, and that there is a tendency for additional oxygen to be included with this material so that the oxygen/uranium ratio will increase to 2.02 to 2.04, even at room temperature. This additional oxygen has a detrimental effect on fuel elements.

It is an object of the present invention to produce uranium dioxide fuel of maximum density.

It is an additional object of this invention to provide a process for producing high density urania powder suitable for use in nuclear fuel elements.

It is a further object of this invention to produce a uranium dioxide fuel element where the oxygen/uranium ratio is 2.00.

A still further object of this invention is to produce a uranium-dioxide fuel element having a maximum density and a maximum structural stability.

These and other objects will be apparent to one skilled in the art from the following specification, which is limited only by the claims appended thereto.

It has been found that ammonium diuranate can be processed to form uranium dioxide pellets at least 95 percent dense. The pellets have high structural strength, which produces a fuel element for atomic reactors, that has all of the desired properties of an oxide element, and thereby avoids the difficulties encountered with metallic elements. The ammonium diuranate should have a particle size greater than 0.1 micron, and it has been found that a particle size of 0.1 to 0.5 micron has produced acceptable pellets having a 95 percent density and that 0.5 micron particles give a higher density pellet with less chance of cracking.

Briefly, the process comprises compacting ammonium diuranate into a green compact, heating this to a decomposition temperature and then continuing heating to a sintering temperature.

COMPACTING

Compacting ammonium diuranate under a pressure of not less than about ½ ton per square inch will give a compact of sufficient green strength to allow firing without the compact breaking from internal stress, provided the rate at which the green ware is heated to the decomposition temperature of ammonium diuranate is properly controlled.

Varying amounts of water may be added to the ammonium diuranate to assist the compaction process, the amount of water added depending somewhat upon the manner in which compaction is effected. In ordinary pressing, for example, as between opposed dies, amounts of water from 0 to 10 percent are useful, while compacting processes such as extrusion may require as much as 25 to 50 weight percent water.

DECOMPOSING

Decomposition of ammonium diuranate takes place during heating starting at room temperature and is completed by 500° C. and the compart must be heated to this temperature. The rate of heating is critical and depends on the initial compacting pressure. If the original compacting pressure is ½ ton per square inch, then the green compact may be raised to the temperature range in which decomposition takes place at a much faster rate than can a similar compact which has been pressed at 10 tons per square inch. The compact that has been prepared at ½ ton pressure per square inch may be heated as fast as about 100° C. per hour up to 500° C. to effect decomposition of the diuranate. A compact pressed at 5 tons per square inch, however, should be raised to 500° C. in increments of 25° C. per hour. During the decomposition phase, that is, during the heating of the diuranate compacts to 500° C., the atmosphere within the furnace is preferably wet hydrogen, which provides additional moisture, insuring that the process will operate as desired. After the compact has been brought to 500° C. and maintained at this temperature for a sufficient time to complete decomposition of the diuranate, the temperature is raised to the sintering temperature.

When it is desired to produce urania particles of at least 95 percent density rather than integral compacts, the ammonium diuranate is compacted at higher pressures, for examples, 5 to 10 tons per square inch or greater, and heated to about 500° C. at rates in excess of those at which physical integrity of the compact can be maintained. Generally, a compact produced by pressing at about 10 tons per square inch will break into cubes $\frac{1}{16}$ inch to $\frac{1}{8}$ inch in size when heated at a rate of at least 100° C. per hour. The heating rate can be varied somewhat, depending upon the amount of compacting pressure used, the higher pressures permitting slower heating rates and lower pressures requiring faster heating rates. Having fragmented the compact by rapid heating through the decomposition range, densification of the individual particles is achieved by heating them to temperatures on the order of the sintering previously mentioned for integral compacts. Since each particle of the material produced by this means is at least 95 percent dense, the material can be used to form long lengths of fuel elements by procedures such as swaging or into more intricate shapes by slip casting. For example, a suitable container can be filled with particulate urania and then swaged, drawn or extruded to compact the urania and reduce the cross-sectional area of the composite while increasing the length thereof.

SINTERING

The compact is raised to the sintering temperature after decomposition. The rate of increasing the temperature is not critical and is commonly 50 to 250° C. per hour. The final sintering temperature is an inverse factor of the initial compacting pressure. That is, the higher the initial compacting pressure, the lower the final sintering temperature may be to attain maximum density.

A compact produced by pressing at ½ ton per square inch, heated to 500° C. as described above, which temperature was achieved at a rate of 100° C. per hour in wet hydrogen, must then be raised to a sintering temperature of about 1700° C., where it is held in a wet hydrogen atmosphere for about one hour, and then cooled in dry hydrogen at the furnace cooling rate. This gives a compact of at least 95% density. This maximum sintering temperature is critical and a compact prepared under a pressure of ½ ton per square inch, heated to only 1500° C., does not achieve the necessary density, regardless of the length of time it is held at this temperature, and 1700° C. as shown above is necessary.

*Example I*

Ammonium diuranate of a particle size between 0.1 and 0.5 micron with 10 percent water, is compacted under a pressure of ½ ton per square inch and then placed in a furnace. The furnace is maintained under an atmosphere of wet hydrogen, which is obtained by bubbling hydrogen through water at room temperature (approximately 20° C.). Hydrogen having a dew point of 0.0° C. would also be acceptable, but hydrogen of a somewhat higher dew point is preferred to insure reproductivity of results. The furnace is then heated at a rate of 100° C. per hour up to 500° C. to effect decomposition of the diuranate. After decomposition, the compact is sintered by raising the temperature at about 100° C. per hour to 1700° C., maintaining an atmosphere of wet hydrogen, and held at this temperature for about one hour. Then dry hydrogen is introduced into the furnace and the furnace is allowed to cool. This compact has a density of at least 95 percent.

*Example II*

Ammonium diuranate containing 10 percent water is compacted under a pressure of 5 tons per square inch and is placed in a furnace under an atmosphere of wet hydrogen, as in Example I, and the temperature is raised 25° C. per hour to 500° C. to decompose the ammonium diuranate. After decomposition, the compact is sintered by raising the temperature at approximately 100° C. per hour to 1500° C. and held for 8 hours in an atmosphere of wet hydrogen. The furnace is then allowed to cool at the rate of 200° C. to 300° C. per hour in an atmosphere of dry hydrogen. This compact has a 95 percent density.

It has been found that when the sintering temperature of 1500° C. is used, the compact should be held at this temperature for about 4 to 8 hours, but when a higher sintering temperature is used, the compact can be sintered for much shorter times. Sintering temperatures approaching 2000° C. might require only a few minutes, while temperatures in the range of 1700 to 1800° C. probably require about one hour.

The sintering time or temperature may be materially reduced if the compact is pressed at a higher pressure and processed in the manner described.

The above process produces a compact consisting of uranium dioxide without additional oxygen that has at least 95 percent of a maximum theoretical density and is therefore useful as a fuel element.

The use of dry hydrogen after sintering is essential to obtain a compact of uranium dioxide, otherwise additional oxygen is present, which is subject to radiation damage.

While the best forms of the preferred embodiments of the invention have been described as required by law, it will be apparent to those skilled in the art that it may be applied to other systems of producing fuel elements, and changes may be made in the form to suit special conditions within the scope of this invention as set forth in the appended claims.

What I claim as new and desire to secure by Letters Patent of the United States is:

1. A process for producing uranium dioxide particles which are at least 95 percent dense, comprising compacting ammonium diuranate to form a green compact, and heating the green compact in a reducing atmosphere to a temperature reducing the ammonium diuranate to uranium dioxide, and performing the heating at a rate causing the green compact to fragmentize due to internally induced stresses.

2. A process for producing uranium dioxide particles which are at least 95 percent dense, comprising compacting amonmium diuranate at a pressure of not less than about 10 tons per square inch to form a green compact, heating the green compact in a reducing atmosphere to a temperature reducing the ammonium diuranate to uranium dioxide, and performing the heating at a rate of not less than about 100° C. per hour.

References Cited by the Examiner

UNITED STATES PATENTS

| | | | |
|---|---|---|---|
| 2,906,598 | 9/59 | Googin | 23—14.5 |
| 2,950,238 | 8/60 | Nicholson | 176—67 |
| 2,953,430 | 9/60 | Leaders et al. | 23—14.5 |
| 2,967,141 | 1/61 | Picklesimer et al. | 176—69 |
| 3,114,689 | 12/63 | Cope | 252—301.1 |

OTHER REFERENCES

AEC Document TID 7546, Book 2, pp. 386 and 387, November 1957.

Chemical Processing, January 1957, "Safe Production of Enriched Uranium Oxide," pp. 82 and 83.

2nd Geneva Conference on Atomic Energy, September 1958, vol. 4, page 85.

2nd Geneva Conference on Atomic Energy, September 1958, vol. 6, pages 593, 592, and 602.

CARL D. QUARFORTH, *Primary Examiner.*

ROGER L. CAMPBELL, OSCAR R. VERTIZ,
*Examiners.*